United States Patent
West

(12) 
(10) Patent No.: US 6,665,976 B2
(45) Date of Patent: Dec. 23, 2003

(54) METHOD AND FISHING LURE FOR PRODUCING OSCILLATORY MOVEMENT

(76) Inventor: Daron K. West, 8725 Old Federal Rd., Ballground, GA (US) 30107

( * ) Notice: Subject to any disclaimer, the term of this patent is extended or adjusted under 35 U.S.C. 154(b) by 0 days.

(21) Appl. No.: 09/906,942

(22) Filed: Jul. 18, 2001

(65) Prior Publication Data

US 2002/0104250 A1 Aug. 8, 2002

Related U.S. Application Data

(63) Continuation-in-part of application No. 09/740,750, filed on Dec. 19, 2000.

(51) Int. Cl.[7] .............................................. A01K 85/00
(52) U.S. Cl. .......................................... 43/17.1; 43/26.1
(58) Field of Search ............................... 43/17.1, 26.1, 43/26.2, 42.31

(56) References Cited

U.S. PATENT DOCUMENTS

| | | | |
|---|---|---|---|
| 2,757,475 A | | 8/1956 | Pankove |
| 3,310,902 A | | 3/1967 | Godby |
| 3,728,811 A | * | 4/1973 | Weimer ...................... 43/26.2 |
| 3,841,012 A | * | 10/1974 | Maled ......................... 43/26.1 |
| 3,940,868 A | | 3/1976 | Northcutt .................... 43/17.6 |
| 4,223,467 A | | 9/1980 | Hodges, Jr. et al. |
| 4,380,132 A | | 4/1983 | Atkinson |
| 4,416,080 A | | 11/1983 | Morrissette |
| 4,602,451 A | * | 7/1986 | Perez et al. ................. 43/26.1 |
| 4,714,208 A | * | 12/1987 | Holahan et al. ......... 242/84.52 |
| 4,805,339 A | | 2/1989 | Fuentes et al. |
| 5,105,573 A | * | 4/1992 | Mays .......................... 43/17.1 |
| 5,157,857 A | | 10/1992 | Livingston ................... 43/17.6 |
| 5,406,734 A | | 4/1995 | Ho et al. |
| 5,485,697 A | | 1/1996 | Watson et al. |
| 5,697,182 A | * | 12/1997 | Rodgers ...................... 43/17.1 |
| 5,875,582 A | * | 3/1999 | Ratzlaff et al. .............. 43/26.1 |
| 5,983,553 A | * | 11/1999 | Gordon ....................... 43/17.6 |
| 6,035,574 A | | 3/2000 | Ware |
| 6,047,492 A | | 4/2000 | Watson et al. |
| 6,050,022 A | | 4/2000 | Brick |
| 6,057,753 A | | 5/2000 | Myers |
| 6,108,962 A | | 8/2000 | Barron |
| 6,108,963 A | | 8/2000 | Lucas et al. |
| 6,192,617 B1 | | 2/2001 | Lyles |

FOREIGN PATENT DOCUMENTS

WO  WO 99/21416  5/1999  .......... A01K/85/00

OTHER PUBLICATIONS

Frasure, L. Besides A Vortex Plant at Kalispell and the 30–Mile Length of Flathead Lake, This Corner of Montana Boasts the Large Trout, Mackinaw, *Lewiston Morning Tribune,* Sep. 27, 1990, p. 2D, News Section.

* cited by examiner

*Primary Examiner*—Charles T. Jordan
*Assistant Examiner*—Susan C. Alimenti
(74) *Attorney, Agent, or Firm*—Merchant & Gould

(57) ABSTRACT

A fishing lure that oscillates from side to side to provide motion to the fishing lure as way for attracting fish. The lure comprises a body which simulates a living creature, where a central portion thereof includes an intermittently operable motor, and operating in a reversible manner, to achieve the oscillating motion. Further, the motor is controlled by a preprogrammed microprocessor.

20 Claims, 4 Drawing Sheets

METHOD AND FISHING LURE FOR PRODUCING OSCILLATORY MOVEMENT

RELATED APPLICATION

This application is a continuation-in-part of Ser. No. 09/740,750, filed Dec. 19, 2000, under the title, "Battery Powered Vibrating Fishing Lure", the inventor hereof, where the contents thereof are incorporated herein by reference.

FIELD OF THE INVENTION

This invention is directed to the field of fishing lures, more particularly to a battery powered oscillating fishing lure to simulate an active and live bait.

BACKGROUND OF THE INVENTION

The present invention relates to a unique fishing lure of the type to simulate live fish bait to attract fish to be caught. The purpose of any fishing lure is to attract a fish by mimicking a creature which is a part of the normal diet of the fish, such as a worm, amphibian, or smaller fish. Among the expedients taught by the prior art are arrangements for producing sounds and vibrations. For example, U.S. Pat. No. 2,552,730, to Miller, provides a leaf spring which vibrates when the fishing line is given a sudden jerk. Since the spring vibrates in the water, however, the vibrations are of only short duration and thus effective only if a fish is in the immediate vicinity of the lure at the instant the spring is put in motion. U.S. Pat. No. 2,909,863, to Rector et al., discloses a lure which produces a knocking or tapping sound, by means of a weight striking the walls of the hollow interior of the lure. The action of this lure depends upon movement of the lure through the water, and, consequently, results in an erratic tapping rather than uniform vibrations. A piezoelectric transducer powered by a transistorized oscillator circuit is utilized in the lure shown in U.S. Pat. No. 2,757,475, to Pankove.

Further, plug-type lures having internal eccentric, vibrating or buzzing means for producing noise and lure vibration are known in the art. Typical of these lures is the Eccentric Motion Fishing Lure described in U.S. Pat. No. 3,841,012, to Maled, which includes a lure characterized by a hollow body which is caused to vibrate by a rotor, motor and battery combination located inside the body cavity. The battery is wired to the motor and drives an eccentrically mounted weight on the motor output shaft, which weight rotates and strikes the inside cavity of the body to produce vibration, motion, and sound. Another similar lure of the plug design is the Sonic Fishing Lure described in U.S. Pat. No. 3,310,902, to Godby, which lure includes a vibrating coil and breaker point system which are energized by a battery and activated by a switch means operated by tension applied to the connecting line. Buzzing or vibrating of the internal coil and breaker point system is accomplished by pulling or jerking the line to slidably displace the switch with respect to the lure body, and thus complete the electrical circuit.

More recent developments for vibrating lures are described in the further U.S. Patents, namely:

a.) U.S. Pat. No. 4,223,467, to Hodges, Jr. et al., teaches a vibrating fishing lure which includes a hollow body carrying at least one set of hooks and a coil and breaker point vibrator combination mounted in the hollow interior of the body. The vibrator is activated by an attitude sensitive switch and is powered by a battery. The battery is removably positioned in a cylindrically shaped carrier and sleeve located inside the hollow body with access to the battery provided by a water tight threaded cap.

b.) U.S. Pat. No. 4,380,132, to Atkinson, discloses a fishing lure having a water-tight cavity with a wire spring within the cavity, one end of the spring being rigidly affixed to the lure body and the opposite end carrying a weight. The relationship between the cavity size and the weighted spring is such that the spring will oscillate freely within the cavity without the weight striking the cavity walls during normal movement of the lure through the water. Alternate forms of the invention utilize an electronic oscillator driven transducer to produce vibration of the lure body.

c.) U.S. Pat. No. 4,805,339, to Fuentes et al., relates to a sonic fishing lure having an energy source, an electrical circuit, and a sonic transducer, where are each respectively contained within chambers of a generally hollow cylindrically-shaped fishing lure. Due to the construction of the fishing lure, the sound output from the fishing lure is of a greater intensity and is produced for a longer period of time than that of prior art devices. The sound output from a coil activator vibrating plate type of transducer is enhanced by the addition of a second vibrating plate. A fluid connection between the outer surface of the sound transducer and the body of the fishing lure further enhances and intensifies the sound output by the fishing lure.

d.) U.S. Pat. No. 6,035,574, to Ware, teaches a fishing lure for producing vibrations of a pre-determined frequency to attract fish. The fishing lure is provided with a streamlined body to substantially eliminate sound generating turbulence as the fishing lure is pulled through the water. The body is also provided with a shaft passing through the body to cause water passing through the shaft to generate vibrations of a pre-determined frequency known to attract fish. A hook is securely fastened to the body to reduce excess noise otherwise associated with the hook contacting the body.

e.) U.S. Pat. No. 6,047,492, to Watson et al., discloses a fishing lure having a battery-powered oscillator circuit positioned within a water-resistant container module that is removably inserted into a selected body module. The module is balanced to insure proper lure action even as fish-attracting sounds and motions are generated from the container module.

From the foregoing discussion it is clear that there have been many attempts at providing the ideal fishing lure for the many fishermen looking for the best means for attracting a fish. While the above prior art present a variety of such means, none offer the combination of features found in the present fishing lure. Such combination includes a system that oscillates from side to side, a preprogrammed microprocessor that operates to effect an intermittent and alternate oscillating operation as it moves through the water. The manner by which the present invention brings together all these features will become more apparent in the description which follows, particularly when read in conjunction with the accompanying drawings.

SUMMARY OF THE INVENTION

This invention is directed to an oscillating fishing lure that oscillates from side to side. The fishing lure comprises a dynamically shaped body to simulate a living body, such as fish, worms, bugs and the like, where the dynamically shaped body may consist of a central housing portion, and preferably first and second end portions threadably engaging opposing ends of the housing portion along a centerline of the body. Within the central housing portion is a battery operated motor, where the fishing lure includes a preprogrammed microprocessor operable to effect the intermittent and alternate operation of the motor. The fishing lure oscillates side to side with a limited clockwise and limited counterclockwise rotation about the centerline of the body. Finally, there are means for securing at least one hook to the body.

Accordingly, an object of the invention is an oscillating fishing lure that includes a battery powered electric motor that intermittently operates between an OFF mode and an ON mode to effect a side by side oscillation of the fishing lure.

Another object hereof is the provision of a fishing lure whose buoyancy can be readily controlled to simulate a fish on top of the water or below the surface.

A further object of this invention is its ability to oscillate without having to be drawn through the water by the fisherman.

These and other objects of the invention will become more apparent in the further description and drawings.

DETAILED DESCRIPTION OF PREFERRED EMBODIMENT

Figure 1:
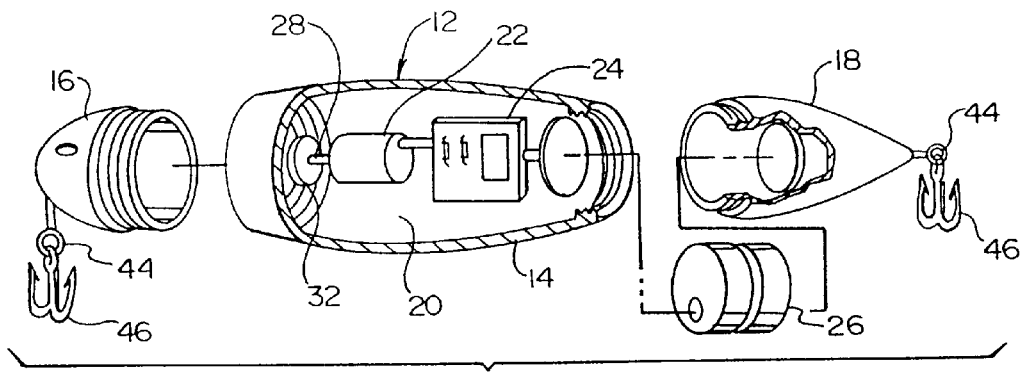
FIG. 1 is an exploded perspective view, with parts removed to reveal internal details, showing a preferred fishing lure body for the lure of this invention.

A first embodiment of this invention, the subject of said co-pending application, relates to a fishing lure that emanates a randomly emitting sound producing vibration to attract fish in the water. The lure may be shaped to simulate a variety of living creatures, such as a small fish, worms, amphibians, crawdads, bugs and the like, where a preferred embodiment is that of a small fish. The first embodiment for the fishing lure will now be described with regard to the FIGS. 1–6, where like reference numerals represent like components or features throughout the various views.

Figure 2:
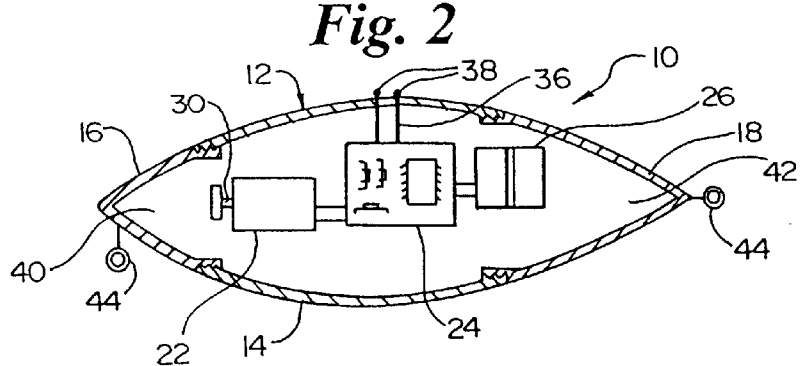
FIG. 2 is a sectional view of the assembled fishing lure of FIG. 1.

FIGS. 1 and 2 illustrate an exemplary fishing lure 10 according to the first embodiment of the present invention. The fishing lure 10 comprises a body 12 to simulate one of the types of living creatures noted above, and includes a hollow, central body portion 14, and a pair of hollow end portions 16, 18, threadably engaging in water tight relationship with respective ends of said central body portion 14. Internally disposed within the cavity 20 of said central body portion is a D.C. motor 22 electrically connected to a programmed microprocessor 24, as more clearly defined later, and a battery source 26, such as one or a pair of rechargeable 1.5 to 3 volt lithium or alkaline batteries, as known in the art, preferably disposed in one of said end portions 18.

Figure 3:
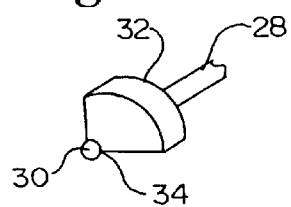
FIGS. 3 to 5 are perspective views of a first embodiment for the present invention, where said first embodiment relates to a vibrating lure that may incorporate eccentric shaped weights for removably securing same to the motor shaft to effect selective vibration of the first embodiment for the fishing lure hereof.
Figure 4:
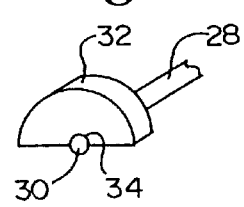
Figure 5:
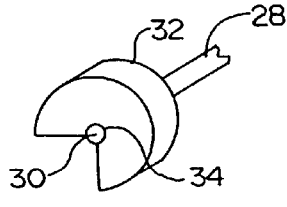
Figure 6:
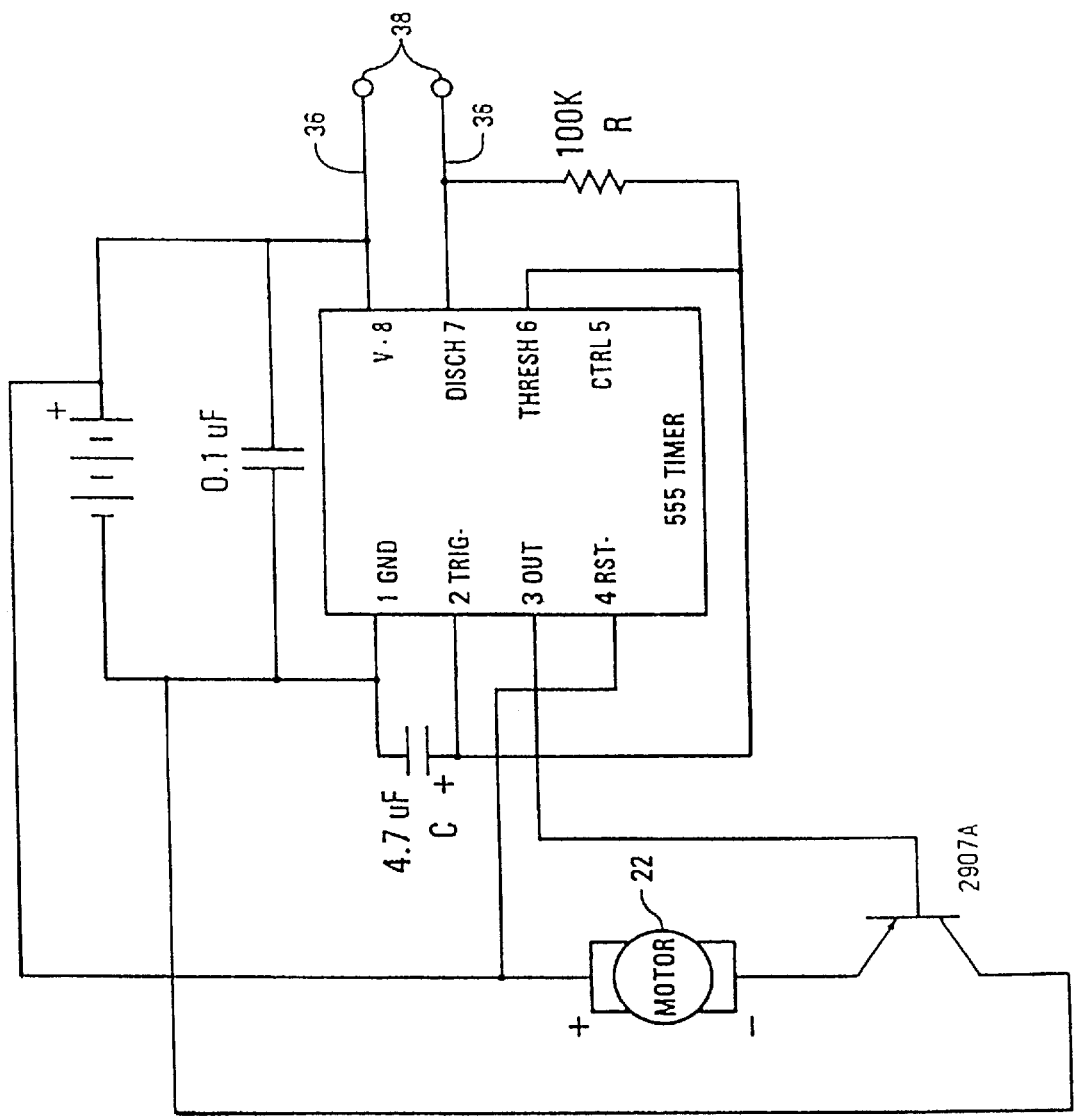
FIG. 6 is a simplified circuitry for the preprogrammed circuit board for operating the motor of the first embodiment.

Extending from said D.C. motor 22 is a rotatable shaft 28 having a free end 30 mounting a weighted and unbalancing element 32 to effect vibration of the lure 10 when the D.C. motor is operable. To ensure the proper degree of vibration, the unbalancing element 32 may assume a variety of shapes, where three exemplary shapes are illustrated in FIGS. 3 to 5. The preferred shapes are arcuate in configuration with a radial extent of about 90° to about 270°, however it should be understood that this radial extent may vary as desired by the fisherman to maximize or minimize the vibration. FIG. 3 shows a quarter section, i.e. 90°, that may be desired to effect a maximum vibration, such as on a rainy or windy day where greater disturbance or action of the lure is desired. FIG. 4 illustrates a half quadrant that may be used on calmer days, whereas FIG. 5 shows a three fourth quadrant that provides minimum vibration, such as in quiet or calm still waters when finesse fishing is the order of the day. In each case, where the respective unbalancing elements 32 are preferably formed of plastic, or the like, the elements 32 include a shaft receiving slot 34 for snap engaging said free end of the rotatable shaft 28. This allows for the easy replacement of the weighted element 32 as the weather and fishing conditions may exist or dictate.

The brains of the fishing lure is the programmable microprocessor 24. The microprocessor may take the form of a stable timing circuit, such as a TLC555 Timer circuit, as manufactured by Archer and available from Radio Shack, a division of Tandy Corporation. The preferred timing circuit is a monolithic timing circuit fabricated using the LinCMOS process, where LinCMOS is a trademark for a silicon-gate IC process by Texas Instruments. The timing circuit includes a high-impedance input that is capable of producing accurate time delays and oscillations, and can achieve both monostable and astable operation. In the preferred latter operation, where the circuit includes a single capacitor and a pair of resistors, once the capacitor is charged, the capacitor releases its stored energy through a PNP transistor that acts as a switch to send direct power from the battery source 26 to the D.C. motor 22. Besides a manual switch operating in association with the PNP transistor, as known in the art, an automatic switching means may be incorporated into the lure 10. Alternatively, an automatic switching mechanism may be incorporated into the fishing lure in the form of a pair of electrodes 36, see FIGS. 1 and 2, that are exposed externally at leads 38. When the fishing lure is submersed in water, the water completes the electrical circuit between the respective leads, thus switching the circuit to ON to effect vibration of the fishing lure 10, see further the simplified circuit board of FIG. 6. The programmable microprocessor is operable to effect an automatic, intermittent or timed delay operation of the D.C. motor 22.

Returning to FIGS. 1 and 2, the respective hollow end portions 16, 18 include cavities 40, 42 to which may be added weights, as desired, to control the depth of the fishing lure 10, or buoyancy thereof. For example, no weights may be needed for a top floating lure, or selective weights may be used to control the depth of the lure. Additionally, externally the respective end portions may include eyelets 44 to which hook assemblies 46 may be removably attached.

Figure 7:
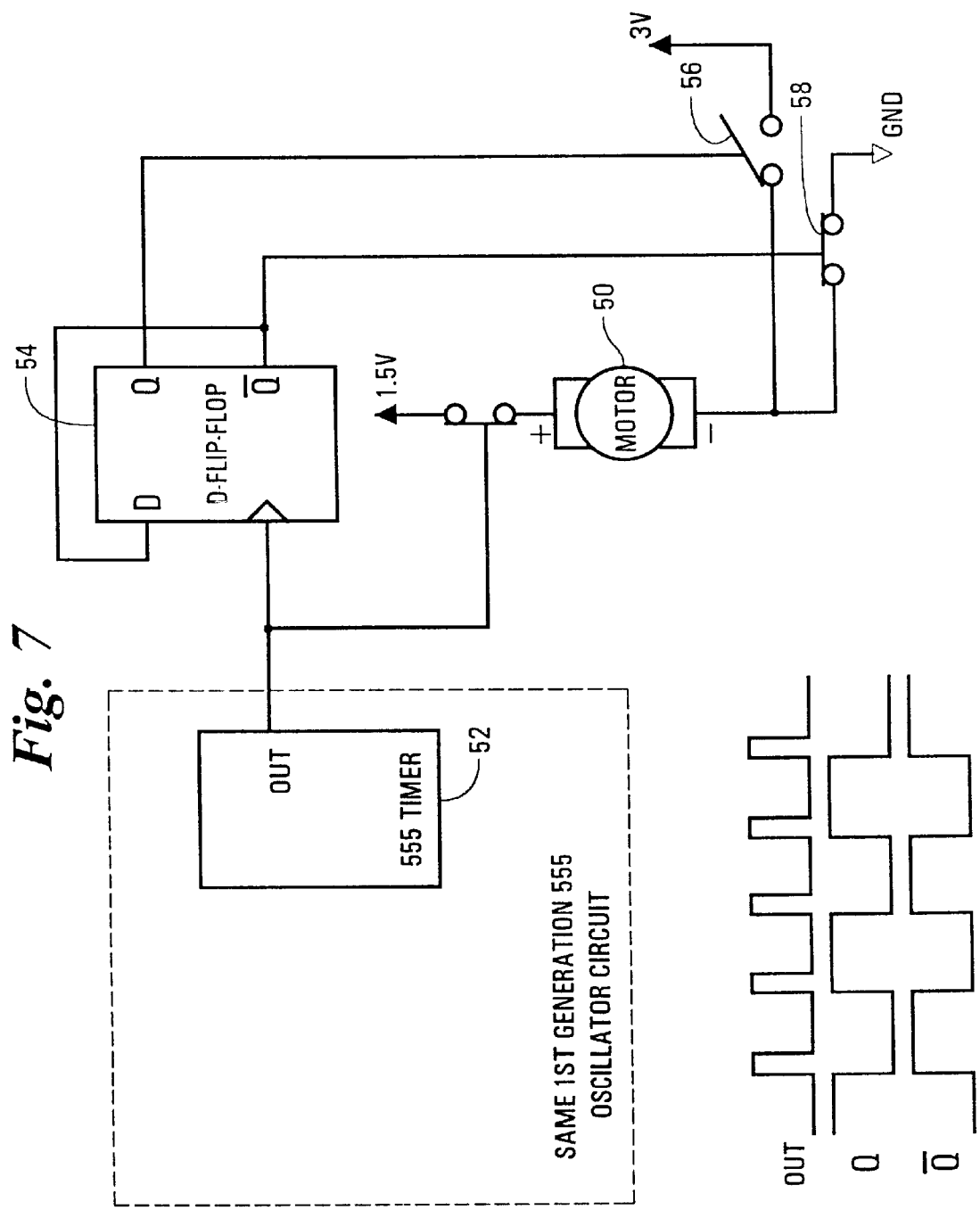
FIG. 7 is a simplified circuitry for the preprogrammed circuit board to effect oscillating of the fishing lure according to a second embodiment of this invention.

FIG. 7 illustrates a simplified circuit board for controlling and operating the oscillating action of the fishing lure according to the second embodiment. Before discussing the circuitry, it will be noted that the body of the fishing lure, according to the second embodiment, may take the shape of the lure as described above. As a consequence, the further description will be limited to the operation of the oscillating mechanism. Turning now to the circuit, the circuit works by flipping the polarity of the voltage across the motor 50 back and forth. With every pulse from the output of the 555 timer 52, as described above, the polarity across the motor 50 flips so that the motor will run clockwise with one pulse of the 555 timer and then counter clockwise with the next pulse. The flipping of the polarity of the motor is controlled by a D-flip flop 54, as known in the art. The flip flop is configured such that each time it is clocked, that is each time a pulse from the 555 timer is received, the Q and Q– outputs change state. The Q and Q– outputs are always in the opposite state from each other, for example, if Q is high, then Q– is low. The Q and Q– outputs then control switches 56, 58, such as transistor switches, as known in the art, to select the voltage polarity across the motor 50. The switches 56, 58 swap in and out 3V and GND on the negative side of the motor. Note that the switches are never both closed at the same time because they are controlled by Q and Q– which are always in an opposite state from each other. When GND is connected to the negative side of the motor, current flows into the positive side, through the motor, and into GND. When 3V is connected to the negative side of the motor 50, current flows into the negative side, through the motor, and into 1.5V to thereby reverse the motion of the motor.

Figure 8B:
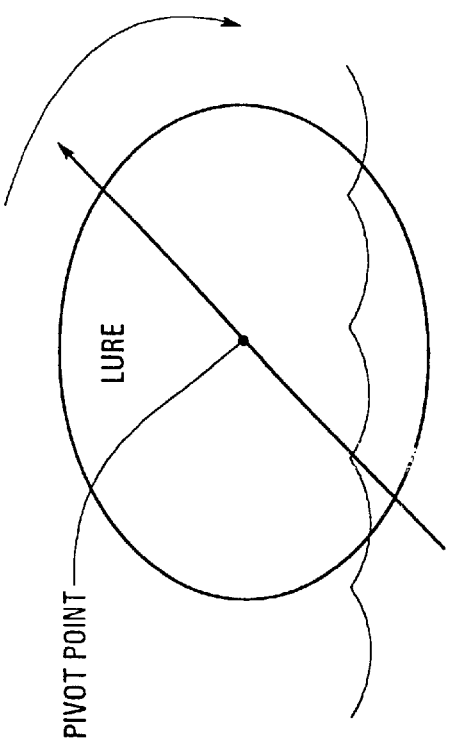
FIGS. 8A and 8B are simplified sectional views of the fishing lure for the second embodiment, showing the extent of oscillating movement, respectively, a counterclockwise movement and a clockwise movement of the lure hereof.
Figure 8A:
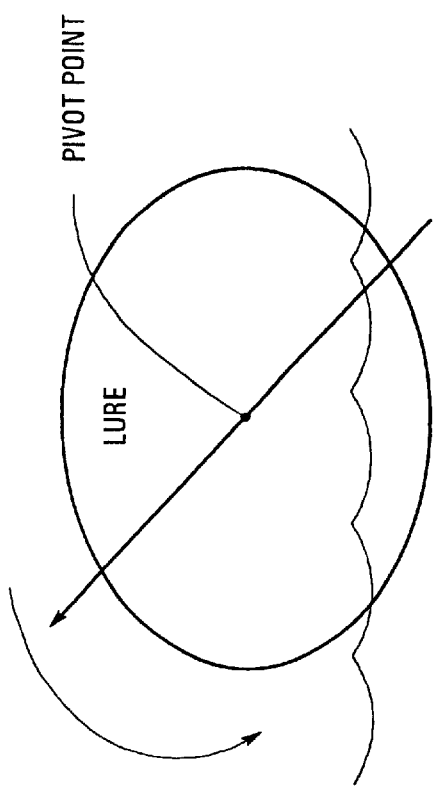

It was discovered that when the current to the motor shuts off, the fishing lure continues to move from side to side, see FIGS. 8A and 8B showing the oscillating movement to be experienced by the fishing lure according to the second embodiment hereof. This movement is caused by the torque of the motor shutting down, where a preferred running time is 1.5 seconds ON, and 0.5 seconds OFF. Further, during the initial activation of the fishing lure in the clockwise direction there is rotational movement with lateral sway and slight flexion and extension also. To increase the overall movement of the fishing lure the motor switches direction at a point when the lure is swinging back in a clockwise direction creating additional force, thus providing more movement for the lure.

It is recognized that changes, variations and modifications may be made to the fishing lure of this invention, particularly by those skilled in the art, without departing from the spirit and scope of the invention. Accordingly, no limitation is intended to be imposed on this invention, except as set forth in the accompanying claims.

What is claimed is:

1. An oscillating fishing lure comprising:
   a.) a dynamically shaped body having front and rear portions along an axially extending center line, where said body is designed to simulate a living body and selected from the group consisting of fish, worms, bugs, and the like, said dynamically shaped body containing a central housing portion;
   b.) a battery powered, reversible electric motor mounted within said central housing portion, said electric motor intermittently and alternately operable in a limited clockwise and limited counter clockwise directions about said center line;
   c.) a preprogrammed micro processor operable to effect the intermittent and alternate operation of said electric motor, whereby to effect a side-to-side oscillation of said fishing lure about said center line; and,
   d.) means for securing at least one hook to said body.

2. The oscillating fishing lure according to claim 1, wherein said fishing lure repeatedly oscillates between first and second positions.

3. The oscillating fishing lure according to claim 2, wherein said fishing lure continues to move between said positions when said motor is shut down.

4. The oscillating fishing lure according to claim 3, wherein said motor is sequentially operable for about 1.5 seconds in an ON mode, and about 0.5 seconds in an OFF mode.

5. The oscillating fishing lure according to claim 1, wherein said preprogrammed processor includes an electrical circuit that flips the polarity across said electric motor to effect the reversible motion thereof.

6. The oscillating fishing lure according to claim 5, wherein the flipping of the polarity of said electric motor is controlled by a D-flip flop, with said D-flip flop configured with first and second outputs that are always in the opposite state of operability.

7. The oscillating fishing lure according to claim 1, wherein said electric motor is powered by a replaceable and rechargeable battery.

8. The oscillating fishing lure according to claim 1, wherein said front and rear portions include means for securing hooks thereto.

9. The oscillating fishing lure according to claim 1, wherein said preprogrammed microprocessor is a microelectronic chip board operable to control functions of said electric motor.

10. A vibrating fishing lure, comprising:
    a lure body having a cavity;
    a hook attached to the lure body;
    a DC motor having an eccentrically weighted shaft and being mounted within the cavity of the lure body; and
    a control circuit disposed within the cavity of the lure body, wherein the control circuit includes a DC power source and is configured to intermittently reverse the DC voltage polarity from the DC power source to the DC motor to impart vibrations to the lure body while intermittently reversing the direction of DC motor rotation.

11. The vibrating fishing lure of claim 10, wherein the control circuit provides intermittent DC power from the DC power source to the DC motor to impart intermittent vibrations to the lure body.

12. The vibrating fishing lure of claim 10, wherein the lure body comprises a first end section threadedly engaging a first end of a central section and a second end section threadedly engaging a second end of the central section that is opposite the first end.

13. The vibrating fishing lure of claim 10, wherein the control circuit comprises a timer circuit that is configured to intermittently turn a transistor on and off to intermittently provide voltage from the DC power source to the DC motor through the transistor and intermittently change states of a flip flop that reverses the polarity of the DC power source to the DC motor.

14. The vibrating fishing lure of claim 10, wherein the control circuit further comprises two electrodes that complete a circuit from the DC power source to the timer circuit upon placement of the lure body in water.

15. The vibrating fishing lure of claim 10, wherein the lure body is shaped to resemble a living creature.

16. The vibrating fishing lure of claim 10, wherein the eccentrically weighted motor comprises a weight extending 90 degrees.

17. A method of vibrating a fishing lure, comprising:
    providing a lure body having a cavity and a hook attached to the lure body;

eccentrically weighting a shaft of a DC motor disposed in the lure body; and intermittently reversing polarity of DC voltage between a DC power source disposed in the lure body and the DC motor with a control circuit that receives DC voltage from the DC power source and provides DC voltage to the DC motor to intermittently reverse rotation of the DC motor and impart vibrations upon the lure body.

18. The method of claim 17, wherein intermittently reversing polarity of DC voltage comprises:

timing a DC output from a timer circuit of the control circuit to change states of a flip flop of the control circuit that is configured to trigger a first polarity and a second polarity of DC voltage to the DC motor; and reversing the DC voltage polarity from the DC power source to the DC motor when the flip flop changes states.

19. The method of claim 17, further comprising intermittently supplying DC power from the control circuit to the DC motor to impart intermittent vibrations to the lure body.

20. The method of claim 19, further comprising timing an output pulse to a transistor of the control circuit to intermittently supply the DC power to the DC motor.

* * * * *